United States Patent [19]
Planche et al.

[11] Patent Number: 5,883,162
[45] Date of Patent: Mar. 16, 1999

[54] PROCESS FOR THE PREPARATION OF ELASTOMER/BITUMEN COMPOSITIONS AND THEIR APPLICATION AS ROAD SURFACINGS

[75] Inventors: Jean-Pascal Planche, Saint-Just-Chaleyssin; Laurent Germanaud, Heyrieux; Annie Zins, Seyssuel, all of France

[73] Assignee: Elf Exploration Production, Cedex, France

[21] Appl. No.: 860,153

[22] PCT Filed: Oct. 16, 1998

[86] PCT No.: PCT/FR96/01614

§ 371 Date: Aug. 20, 1997

§ 102(e) Date: Aug. 20, 1997

[87] PCT Pub. No.: WO97/14754

PCT Pub. Date: Apr. 24, 1997

[30] Foreign Application Priority Data

Oct. 19, 1995 [FR] France .................. 95/12276

[51] Int. Cl.$^6$ .............. C08L 95/00; C08L 5/36; C08C 19/26; C08F 36/04
[52] U.S. Cl. .............. 524/68; 523/351; 524/59; 524/68; 524/302; 524/303; 524/304; 524/705; 525/332.6; 525/333.5; 525/345

[58] Field of Search .................. 524/50, 68, 69, 524/70, 71, 302, 303, 304, 305; 523/351; 525/332.6, 333.5, 345

[56] References Cited

U.S. PATENT DOCUMENTS

| 4,126,482 | 11/1978 | Signouret et al. | 524/69 |
| 5,719,216 | 2/1998 | Schermer et al. | 524/59 |
| 5,804,619 | 9/1998 | Nicol et al. | 524/68 |

*Primary Examiner*—Peter A. Szekely
*Attorney, Agent, or Firm*—Burgess, Ryan & Wayne

[57] ABSTRACT

Functionalized elastomer/bitumen compositions with a broad plasticity range are produced by contacting a bitumen or bitumen mixture with an elastomer, a functionalizing agent and optionally a peroxide compound at 100°–230° C. under stirring conditions. The funtionalizing agent is a thiolcarboxylic acid having 3 or more carbon atoms, a thiolcarboxylic acid ester and specifically a disulphide having carboxylic groupings or carboxylic esters. The compositions may be used either directly or in diluted form to produce bituminous binders for making road surfacings, coated materials and sealing coatings.

56 Claims, No Drawings

PROCESS FOR THE PREPARATION OF ELASTOMER/BITUMEN COMPOSITIONS AND THEIR APPLICATION AS ROAD SURFACINGS

BACKGROUND OF THE INVENTION

1. Field of the Invention

The invention relates to a process for the preparation of functionalized elastomer/bitumen compositions with a wide plasticity range. It further relates to the application of the compositions obtained to the production of coatings and in particular of road surfacings, of bituminous mixes or else of watertight facings and it also relates to a mother solution which can be employed for the preparation of the said compositions.

2. Background Art

A description is given, in the citation U.S. Pat. No. 4,011,184, of a process for the preparation of functionalized elastomer/bitumen compositions, one of the methods of preparation of which consists in bringing a bitumen into contact, the operation being carried out at temperatures of between 100° C. and 200° C. and with stirring, with an elastomer, particularly a block copolymer of styrene and of a conjugated diene, in an amount representing 0.1% to 25% and very especially 1% to 5% by weight of the bitumen, and an ethylenically unsaturated carboxylic acid or an anhydride of such an acid, for example maleic anhydride, in a proportion corresponding to 0.5% to 10% of the weight of bitumen and of elastomer, the said contact being maintained for a time sufficient to produce, within the bitumen, a functionalized elastomer carrying carboxylic acid or carboxylic acid anhydride functional groups capable of creating directly, by formation of hydrogen bonds, or by addition of a salifying agent capable of reacting with the carboxyl groups, temperature-reversible bridgings between the macromolecular chains of the elastomer and/or between the said macromolecular chains and the bitumen.

The functionalized elastomer/bitumen compositions obtained as indicated above are less susceptible to gelling phenomena than elastomer/bitumen compositions produced by crosslinking elastomers, such as, in particular, block copolymers of styrene and of a conjugated diene, such as butadiene or isoprene, with sulphur within a bitumen. It is possible, for this reason, to produce functionalized elastomer/bitumen compositions which have a high elastomer content and which can act as concentrates. These compositions are more economical to prepare, to store, and to transport than the corresponding compositions with a lower elastomer content and they can be easily diluted at the time of use, by addition of bitumen, in order to form the elastomer/bitumen binders with a lower elastomer content which are commonly used for the preparation of coatings and in particular of road surfacings.

However, the functionalized elastomer/bitumen compositions prepared by using the abovementioned technique described in the citation U.S. Pat. No. 4,011,184 only have to a limited degree carboxyl functional groups attached to the macromolecular chains of the elastomer associated with the bitumen and capable of inducing crosslinkings or bridgings of the said chains with one another and/or with the bitumen, directly or after addition of the salifying agent. For this reason, the physicomechanical characteristics of such compositions, in particular plasticity range (difference between the ball-and-ring softening temperature and the Fraass brittleness point) and mechanical characteristics at low temperatures of use, are not entirely satisfactory.

SUMMARY OF THE INVENTION

It has now been found that it is possible to obtain, by the abovementioned technique, functionalized elastomer/bitumen compositions exhibiting an expanded plasticity range and improved tensile mechanical characteristics by employing a specific functionalization agent in order to introduce, into the elastomer and optionally into the bitumen, the carboxyl or derived functional groups which induce the crosslinkings.

The subject of the invention is thus a process for the preparation of functionalized elastomer/bitumen compositions with a wide plasticity range, of the type in which a bitumen or mixture of bitumens is brought into contact, the operation being carried out at temperatures of between 100° C. and 230° C. and with stirring for a period of time of at least ten minutes, with, with respect to the weight of the bitumen, between 0.5% and 25%, more particularly between 1% and 15%, of an elastomer and between 0.01% and 6%, more especially between 0.05% and 3%, of a functionalization agent, the said process being characterized in that the functionalization agent is composed of at least one compound corresponding to one or other of the formulae

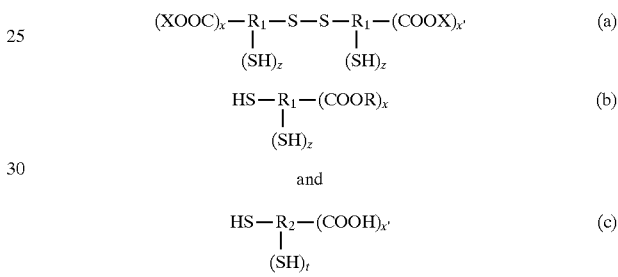

in which X represents a hydrogen atom or a radical R, each $R_1$ denotes an (x+z+1)-valent $C_1$ to $C_{12}$, preferably $C_1$ to $C_8$, hydrocarbon radical, R represents a monovalent $C_1$ to $C_{12}$, preferably $C_1$ to $C_8$, hydrocarbon radical, $R_2$ denotes an (x+t+1)-valent $C_2$ to $C_{12}$, preferably $C_2$ to $C_8$, hydrocarbon radical, t is zero or 1, each x denotes an integer having a value ranging from 1 to 3, preferably equal to 1 or 2, and z is zero or 1, with x+z $\leq$ 3.

DESCRIPTION OF THE PREFERRED EMBODIMENTS

In the formula (a) defining disulphides, the $R_1$ symbols can be identical or different. It is likewise the case with the X symbols, the x symbols and the z symbols.

The functionalization agent is advantageously chosen from disulphides of formula (a) and, in particular, from those of the said disulphides which are represented by a formula (a) for which z is equal to zero. Among these specific disulphides of formula $(XOOC)_x$—$R_3$—S—S—$R_3$—$(COOX)_x$, where X denotes H or an abovementioned R radical, x is an integer ranging from 1 to 3, preferably equal to 1 or 2, and $R_3$ represents an (x+1)-valent $C_1$ to $C_{12}$ and preferably $C_1$ to $C_8$ hydrocarbon radical, those which are very especially suitable correspond to the following formula $(HOOC)_x$—$R_3$—S—S—$R_3$—$(COOH)_x$.

The (x+z+1)-valent hydrocarbon radicals $R_1$ and the (x+1)-valent hydrocarbon radicals $R_3$ can be saturated, linear or branched, $C_1$ to $C_{12}$, preferably $C_1$ to $C_8$ and very especially $C_1$ to $C_6$, aliphatic radicals, unsaturated, linear or branched, $C_2$ to $C_{12}$ preferably $C_2$ to $C_8$ and very especially $C_2$ to $C_6$, aliphatic radicals, $C_4$ to $C_{12}$, preferably $C_6$ to $C_8$ cycloaliphatic radicals or $C_6$ to $C_{12}$, preferably $C_6$ to $C_8$, aromatic radicals.

Likewise, the (x+t+1)-valent hydrocarbon radicals $R_2$ can be saturated, linear or branched, $C_2$ to $C_{12}$, preferably $C_2$ to $C_8$ and very especially $C_2$ to $C_6$, aliphatic radicals, unsaturated, linear or branched, $C_2$ to $C_{12}$, preferably $C_2$ to $C_8$ and very especially $C_2$ to $C_6$, aliphatic radicals, $C_4$ to $C_{12}$, preferably C6 to $C_8$, cycloaliphatic radicals or alternatively $C_6$ to $C_{12}$, preferably $C_6$ to $C_8$, aromatic radicals. As regards the monovalent hydrocarbon radicals R, they can comprise saturated, linear or branched, $C_1$ to $C_{12}$ and preferably $C_1$ to $C_8$ aliphatic radicals, unsaturated, linear or branched, $C_2$ to $C_{12}$ and preferably $C_2$ to $C_8$ aliphatic radicals, $C_4$ to $C_{12}$ and preferably $C_6$ to $C_8$ cycloaliphatic radicals or alternatively $C_6$ to $C_{12}$ and preferably $C_6$ to $C_8$ aromatic radicals. In particular, the monovalent hydrocarbon radicals R are linear or branched, $C_1$ to $C_{12}$ and more especially $C_1$ to $C_8$ alkyl radicals, such as methyl, ethyl, propyl, butyl, hexyl, 2-ethylhexyl, n-octyl or isooctyl.

Examples of functionalization agents which can be used in the process according to the invention are such as mercaptopropionic acid, mercaptobutanoic acid, mercaptosuccinic acid, dimercaptosuccinic acid, ethyl, methyl and isooctyl esters of thioglycolic acid, ethyl, 2-ethylhexyl and n-octyl esters of mercaptopropionic acid and very especially disulphide compounds, such as 2,2'-dithiodiacetic acid of formula: HOOC—$CH_2$—S—S—$CH_2$—COOH, 3,3'-dithiodipropionic acid of formula: HOOC—$CH_2$—$CH_2$—S—S—$CH_2$—$CH_2$—COOH, 4,4'-dithiodibutanoic acid of formula: HOOC—$(CH_2)_3$—S—S—$(CH_2)_3$—COOH, and 2,2'-dithiodisalicylic acid of formula:

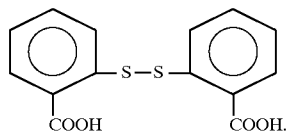

The bitumen or mixtures of bitumens which is employed in the preparation of the functionalized elastomer/bitumen compositions is advantageously chosen from the various bitumens which have a kinematic viscosity at 100° C. of between $0.5 \times 10^{-4}$ $m^2/s$ and $3 \times 10^{-2}$ $m^2/s$ and preferably between $1 \times 10^{-4}$ $m^2/s$ and $2 \times 10^{-2}$ $m^2/s$. These bitumens can be direct distillation or vacuum distillation bitumens or else blown or semi-blown bitumens, propane or pentane deasphalting residues, indeed even some petroleum cuts or mixtures of bitumens and of vacuum distillates or alternatively mixtures of at least two of the products which have just been listed. Besides a kinematic viscosity included within the abovementioned ranges, the bitumen or mixture of bitumens employed in the process according to the invention advantageously has a penetrability at 25° C., defined according to NF Standard T 66004, of between 5 and 800 and preferably between 10 and 400.

The elastomer which is employed in the process according to the invention and which is recovered functionalized by sequences containing carboxylic acid or carboxylic ester functionality in the functionalized elastomer/bitumen compositions resulting from the said process can be composed of one or a number of elastomeric polymers, such as polyisoprene, polynorbornene, polybutadiene, butyl rubber, ethylene/propylene (EP) random copolymers or ethylene/propylene/diene (EPDM) random terpolymers. The said elastomer is advantageously partially, the remaining part being composed of one or a number of polymers as mentioned above or other polymers, or completely composed of one or a number of random or block copolymers of styrene and of a conjugated diene, such as butadiene, isoprene, chloroprene, carboxylated butadiene or carboxylated isoprene, and more particularly. of one or a number of copolymers chosen from block copolymers, with or without a random hinge, of styrene and of butadiene, of styrene and of isoprene, of styrene and of chloroprene, of styrene and of carboxylated butadiene or alternatively of styrene and of carboxylated isoprene. The copolymer of styrene and of conjugated diene, and in particular each of the abovementioned copolymers, advantageously has a styrene content by weight ranging from 5% to 50%. The weight-average molecular mass of the copolymer of styrene and of conjugated diene, and in particular that of the abovementioned copolymers, can be, for example, between 10,000 and 600,000 daltons and preferably lies between 30,000 and 400,000 daltons. The copolymer of styrene and of conjugated diene is preferably chosen from di- or triblock copolymers of styrene and of butadiene, of styrene and of isoprene, of styrene and of carboxylated butadiene or alternatively of styrene and of carboxylated isoprene which have styrene contents and weight-average molecular masses lying within the ranges defined above.

If need be, in order to facilitate attachment of the functional sequences

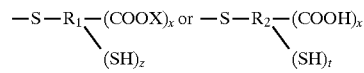

and more particularly —S—$R_3$—$(COOX)_x$ and especially —S—$R_3$—$(COOH)_x$, provided by the functionalization agent, to the elastomer and optionally to the bitumen, it is possible to add a peroxide compound, which generates free radicals at temperatures of between 100° C. and 230° C., to the reaction mixture formed from the bitumen or mixture of bitumens, from the elastomer and from the functionalization agent. The said peroxide compound, employed in an amount ranging from 0% up to, for example, 15% by weight of the elastomer, can be, in particular, chosen from dihydrocarbyl peroxides, such as di-tert-butyl peroxide and dicumyl peroxide.

The bitumen or mixture of bitumens is advantageously brought into contact with the elastomer, the functionalization agent and, if it is employed, the peroxide compound, which operation generates a reaction product constituting the functionalized elastomer/bitumen composition, by first of all incorporating the elastomer in the bitumen or mixture of bitumens, use being made of a proportion of elastomer having a value, with respect to the bitumen, chosen as defined above for this proportion, the operation being carried out at temperatures of between 100° C. and 230° C., more particularly between 120° C. and 190° C., and with stirring for a sufficient period of time, generally of the order of a few tens of minutes to a few hours and, for example, of the order of 30 minutes to 8 hours, in order to form a homogeneous mixture of bitumen and of elastomer, by then introducing the functionalization agent into the said mixture, followed, if it is employed, by the peroxide compound, in appropriate amounts chosen within.the ranges defined above for the said amounts, and by maintaining the whole mixture with stirring at temperatures of between 100° C. and 230° C., more particularly between 120° C. and 190° C., and identical or not to the temperatures for incorporation of the elastomer in the bitumen or mixture of bitumens, for a period of time of at least 10 minutes and generally ranging from 10 minutes to 5 hours, more particularly from 30 minutes to 180 minutes, in order to form the reaction product constituting the functionalized elastomer/bitumen composition.

The abovementioned reaction product, resulting from bringing the bitumen or mixture of bitumens into contact with the elastomer, the functionalization agent and, if it is employed, the peroxide compound, can advantageously have added to it, the addition being carried out with stirring at temperatures of between 100° C. and 230° C. and more particularly between 120° C. and 190° C., one or a number of additives capable of reacting with the carboxyl or carboxylic ester functional groups carried by the elastomer and optionally by the bitumen in order to activate or reinforce the crosslinking between the macromolecular chains of the elastomer and/or between the said macromolecular chains and the bitumen and thus to reinforce the physicomechanical characteristics of the functionalized elastomer/bitumen composition. These reactive additives can be in particular primary or secondary amines, especially polyamines, alcohols, aminoalcohols, epoxides or alternatively metal compounds.

Reactive additives of the amine type are, for example, aromatic diamines such as 1,4-diaminobenzene, 2,4-diaminotoluene, diaminonaphthalene, bis(4-aminophenyl) sulphone, bis(4-aminophenyl) ether or bis(4-aminophenyl) methane, aliphatic or cycloaliphatic diamines such as those of formula $H_2N$—$R_4$—$NH_2$ where $R_4$ denotes a $C_2$ to $C_{12}$ alkylene or $C_6$ to $C_{12}$ cycloalkylene radical, for example ethylenediamine, diaminopropane, diaminobutane, diaminohexane, diaminooctane, diaminodecane, diaminododecane, diaminocyclohexane, diaminocyclooctane or diaminocyclododecane, polyethylenepolyamines or polypropylenepolyamines such as diethylenetriamine, triethylenetetramine, tetraethylenepentamine or dipropylenetriamine or else fatty amines or polyamines, that is to say amines or polyamines containing a $C_{12}$ to $C_{18}$ alkyl or alkenyl radical bonded to the nitrogen atom of an amine group.

Reactive additives of the alcohol type are, in particular, polyols such as diols or triols and especially diols of formula HO—$R_5$—OH, where $R_5$ denotes a hydrocarbon radical, especially a $C_2$ to $C_{18}$ alkylene, $C_6$ to $C_8$ arylene and $C_6$ to $C_8$ cycloalkylene radical, and polyetherdiols of formula HO $[C_qH_{2q}]_r$ H where q is a number ranging from 2 to 6 and especially equal to 2 or 3 and r is a number at least equal to 2 and ranging, for example, from 2 to 20. Examples of such polyols are such as ethylene glycol, propylene glycol, butylene glycol, diethylene glycol, triethylene glycol, tetraethylene glycol, hexanediol, octanediol and polyhydroxylated polybutadiene.

Reactive additives of the metal compound type are, in particular, compounds such as hydroxides, oxides, alcoholates, carboxylates like formates and acetates, methoxides, ethoxides, nitrites, carbonates and bicarbonates of metals from groups I, II, III or VIII of the Periodic Table of the Elements, especially Na, K, Li, Mg, Ca, Cd, Zn, Ba, Al and Fe.

The amount of the reactive additive or of the reactive additives, which are incorporated in the reaction product constituting the functionalized elastomer/bitumen composition and resulting from bringing the bitumen or mixture of bitumens into contact with the elastomer, the functionalization agent and, if it is employed, the peroxide compound, can range from 0.01% to 10% and more particularly from 0.05% to 5% of the weight of bitumen present in the said reaction product. The said amount is advantageously between one and four times the stoichiometric amount corresponding to complete reaction of the reactive additive or of the reactive additives with the functional groups carried by the functionalized elastomer.

The reaction mixture generating the abovementioned reaction product constituting the functionalized elastomer/bitumen composition or the said reaction product itself can further have added to it, the addition being carried out with stirring at temperatures of between 100° C. and 230° C. and more particularly between 120° C. and 190° C., 1% to 40% and more particularly 2% to 30%, by weight of the bitumen, of a fluxing agent which may be composed, in particular, of a hydrocarbon oil which has an atmospheric pressure distillation range, determined according to ASTM Standard D 86-67, of between 100° C. and 600° C. and lying more especially between 150° C. and 400° C. This hydrocarbon oil, which can be in particular a petroleum cut of aromatic nature, a petroleum cut of naphtheno-aromatic nature, a petroleum cut of naphtheno-paraffinic nature, a petroleum cut of paraffinic nature, a coal oil or else an oil of plant origin, is sufficiently "heavy" to limit the evaporation at the time of its addition to the bitumen and, at the same time, sufficiently "light" to be removed as much as possible after the functionalized elastomer/bitumen composition containing it has been spread, so as to regain the same mechanical properties which the functionalized elastomer/bitumen composition prepared without employing any fluxing agent would have exhibited after hot spreading. The fluxing agent can be added to the reaction mixture generating the reaction product constituting the functionalized elastomer/bitumen composition at any time in the constitution of the said reaction mixture or alternatively to the said reaction product. If reactive additives are incorporated in the abovementioned reaction product, the fluxing agent can be added to the said reaction product before or after addition of the said reactive additives to the latter. The amount of fluxing agent is chosen within the ranges defined above, in order to be compatible with the desired final use on the work site.

Besides the reactive additives and the fluxing agent, it is also possible to incorporate, either in the reaction mixture generating the reaction product constituting the functionalized elastomer/bitumen composition, at any time in the constitution of the said reaction mixture, or in the said reaction product, additives which are conventionally employed in compositions based on bitumen and on polymer, such as promoters of adhesion of the functionalized elastomer/bitumen composition to the mineral surfaces or else fillers such as talc, carbon black or worn tyres reduced to fine powder.

In an embodiment of the process according to the invention, employing a hydrocarbon oil as defined above as fluxing agent, the elastomer, the functionalization agent and optionally, if it is employed, the peroxide compound are incorporated in the bitumen or mixture of bitumens in the form of a mother solution of these products in the hydrocarbon oil forming the fluxing agent, in order to constitute the reaction mixture generating the reaction product forming the functionalized elastomer/bitumen composition.

The mother solution is prepared by bringing into contact the ingredients of which it is composed, namely hydrocarbon oil acting as solvent, elastomer, functionalization agent and optionally, if it is employed, peroxide compound, with stirring at temperatures of between 10° C. and 170° C. and more particularly between 40° C. and 120° C. and less than the decomposition temperature of the peroxide compound if the latter is present, for a sufficient period of time, for example from approximately 30 minutes to approximately 90 minutes, to obtain complete dissolution of the elastomer, of the functionalization agent and, if it is present, of the peroxide compound in the hydrocarbon oil.

The respective concentrations of the elastomer, of the functionalization agent and, if it is present, of the peroxide compound in the mother solution can vary quite widely, especially as a function of the nature of the hydrocarbon oil employed for dissolving the elastomer, the functionalization agent and, if it is employed, the peroxide compound. Thus, the mother solution can contain, by weight of the hydrocarbon oil, between 5% and 40% and more particularly between 10% and 30% of elastomer, between 0.05% and 10% and preferably between 0.1% and 8% of functionalization agent and, by weight of the elastomer, 0% to 15% and preferably 0% to 10% of peroxide compound.

To prepare the functionalized elastomer/bitumen compositions according to the invention by making use of the mother solution technique, the mother solution, containing the elastomer, the functionalization agent and, if it is employed, the peroxide compound, is mixed with the bitumen or mixture of bitumens, the operation being carried out at temperatures of between 100° C. and 230° C., more particularly between 120° C. and 190° C., and with stirring, this being done, for example, by incorporating the mother solution in the bitumen or mixture of bitumens maintained with stirring at temperatures of between 100° C. and 230° C. and more particularly between 120° C. and 190° C. and then the resulting mixture is maintained with stirring at temperatures of between 100° C. and 230° C., more particularly between 120° C. and 190° C., for example at the temperatures employed for producing the mixture of the mother solution with the bitumen or mixture of bitumens, for a period of time of at least 10 minutes and generally ranging from 10 minutes to 90 minutes, in order to form a reaction product constituting the functionalized elastomer/bitumen composition.

The amount of mother solution incorporated in the bitumen or mixture of bitumens is chosen to yield the desired amounts, with respect to the bitumen, of elastomer, of functionalization agent and, if it is employed, of peroxide compound, the said amounts being within the ranges defined above.

The functionalized elastomer/bitumen compositions obtained by the process according to the invention can be employed as they are or else diluted with variable proportions of a bitumen or mixture of bitumens or of a composition according to the invention which has different characteristics, in order to form functionalized elastomer/bitumen binders which have chosen contents of functionalized elastomer. These contents can be either equal to (undiluted compositions) the contents of functionalized elastomer in the corresponding initial functionalized elastomer/bitumen compositions or different (diluted compositions) from these latter contents. The dilution of the functionalized elastomer/bitumen compositions according to the invention with a bitumen or mixture of bitumens or with a composition according to the invention of different characteristics can be carried out either directly following the preparation of the said compositions, when a virtually immediate use of the resulting functionalized elastomer/bitumen binders is required, or else alternatively after a more or less extended period of storage of the functionalized elastomer/bitumen compositions, when a delayed use of the resulting functionalized elastomer/bitumen binders is envisaged.

The bitumen or mixture of bitumens employed for the dilution of a functionalized elastomer/bitumen composition according to the invention can be chosen from the bitumens defined above as being suitable for the preparation of the functionalized elastomer/bitumen compositions.

The dilution of a functionalized elastomer/bitumen composition according to the invention with a bitumen or mixture of bitumens or with a second composition according to the invention with a lower content of functionalized elastomer, in order to form a functionalized elastomer/bitumen binder with a chosen content of functionalized elastomer which is lower than that of the functionalized elastomer/bitumen composition to be diluted, is generally carried out by bringing into contact, with stirring and at temperatures of between 100° C. and 230° C. and more particularly between 120° C. and 190° C., suitable proportions of the functionalized elastomer/bitumen composition to be diluted and of bitumen or mixture of bitumens or of second functionalized elastomer/bitumen composition.

The functionalized elastomer/bitumen binders consisting of the functionalized elastomer/bitumen compositions according to the invention or resulting from the dilution of the said compositions with a bitumen or mixture of bitumens or with another functionalized elastomer/bitumen composition according to the invention, as far as the desired content of functionalized elastomer in the said binders, can be applied, directly or after conversion into aqueous emulsion, to the production of road surfacings of the surface coating type, to the production of bituminous mixes which are put in place with heating or cold, or else to the production of watertight facings.

The invention is illustrated by the following examples, given without any limitation being implied.

In these examples, the amounts and percentages are expressed by weight, except when otherwise indicated.

In addition, the rheological and mechanical characteristics of the bitumens or of the functionalized elastomer/bitumen compositions to which reference is made in the said examples are as follows:

penetrability, expressed in 1/10 of an mm and determined according to NF Standard T 66004, ring-and-ball softening temperature,. expressed in ° C. and determined by the ring-and-ball test defined by NF Standard T 66008, tensile rheological characteristics, determined according to NF Standard T 46002 and comprising the quantities:
elongation at break $\epsilon b$, in %,
breaking stress $\sigma b$, in daN/cm$^2$, Pfeiffer's number (abbreviated to PN), calculated from the relationship $$PN = \frac{20 - 500A}{1 + 50A} \text{ with } A = \frac{\log_{10}800 - \log_{10}\text{pen}}{RBT - 25},$$

where "pen" and "RBT" respectively denote the penetrability and the ring-and-ball temperature as defined above, this number providing an indication of the temperature susceptibility of the composition.

EXAMPLES 1 to 7

Control elastomer/bitumen and functionalized elastomer/bitumen compositions (Examples 1 to 5) and functionalized elastomer/bitumen compositions according to the invention (Examples 6 and 7) were prepared in order to evaluate and compare the physicomechanical characteristics thereof.

The preparations were carried out under the following conditions:

Example 1 (control): Preparation of a non-functionalized elastomer/bitumen composition. 965 parts of a bitumen having a penetrability at 25° C., determined according to the conditions of NF Standard T 66004, of 68 and 35 parts of a block copolymer of styrene and of butadiene as elastomer, the said copolymer having a weight-average molecular mass of 100,000 daltons and containing 25% of styrene, were introduced into a reactor maintained at 180° C. and with stirring. After mixing for 3 hours with stirring at 180° C., a homogeneous mass constituting the non-functionalized elastomer/bitumen composition was obtained.

Example 2 (control): Preparation of a functionalized elastomer/bitumen composition (functionalization agent=maleic anhydride). 900 parts of the bitumen employed in Example 1 and 90 parts of the block copolymer of styrene and of butadiene employed in the said Example 1 were introduced into a reactor maintained at 180° C. and with stirring. After mixing for 5 hours with stirring at 180° C., a homogeneous mass was obtained. 5 parts of maleic anhydride were then incorporated, at 180° C. and with stirring, in the contents of the reactor and the reaction mixture thus formed was then maintained at the said temperature and with stirring for a period of time of four hours, in order to form a functionalized elastomer/bitumen composition with a high content of functionalized elastomer which can be used as concentrate. The functionalized elastomer/bitumen composition thus obtained was then diluted with the same bitumen as that employed in Example 1, to a final content of 3.5% of functionalized elastomer in the diluted composition. The dilution operation was carried out at 180° C. and with stirring and the diluted composition formed at the end of the addition of the bitumen was maintained with stirring at 180° C. for a further period of time of one hour in order to complete its homogenization.

Example 3 (control): Preparation of a functionalized elastomer/bitumen composition containing a reactive additive of the polyamine type. By carrying out the preparation as described in Example 2, a functionalized elastomer/bitumen composition with a high content of functionalized elastomer which can be used as concentrate was prepared. 0.2%, by weight of the bitumen, of a fatty amine, namely N-tallow-3-amino-1-propyltetrahydropyrimidine, sold under the name Polyram L 200® by the company CECA, was then added to this composition, maintained with stirring at 180° C., and the whole mixture was maintained with stirring at 180° C. for 1 hour, in order to allow the amine to react with the carboxyl functional groups of the composition. The neutralized functionalized elastomer/bitumen composition thus obtained was then diluted as indicated in Example 2 to a final content of 3.5% of functionalized elastomer in the diluted composition.

Example 4 (control): Preparation of a functionalized elastomer/bitumen composition (functionalization agent=thioglycolic acid). A functionalized elaatomer/bitumen composition with a high content of functionalized elastomer was prepared by carrying out the preparation as described in Example 2 with, however, replacement of maleic anhydride, used as functionalization agent, with 10 parts of thioglycolic acid. The functionalized elastomer/bitumen composition thus obtained was then diluted as indicated in Example 2 to a final content of 3.5% of functionalized elastomer in the diluted composition.

Example 5 (control): Preparation of a functionalized elastomer/bitumen composition neutralized with a reactive additive of the polyamine type. By carrying out the preparation as described in Example 4, a functionalized elastomer/bitumen composition with a high content of functionalized elastomer was prepared. This composition was then neutralized with the fatty amine Polyram L 200, the neutralization being carried out as indicated in Example 3. The neutralized functionalized elastomer/bitumen composition thus obtained was then diluted as indicated in Example 2 to a final content of 3.5% of functionalized elastomer in the diluted composition.

Example 6 (according to the invention): Preparation of a functionalized elastomer/bitumen composition (functionalization agent=dithiodipropionic acid). A functionalized elastomer/bitumen composition with a high content of functionalized elastomer was prepared by carrying out the preparation as described in Example 2 with, however, replacement of maleic anhydride, used as functionalization agent, with 5 parts of 3,3'-dithiodipropionic acid. The functionalized elastomer/bitumen composition thus obtained was then diluted as indicated in Example 2 to a final content of 3.5% of functionalized elastomer in the diluted composition.

Example 7 (according to the invention): Preparation of a functionalized elastomer/bitumen composition neutralized with a reagent of the polyamine type. By carrying out the preparation as described in Example 6, a functionalized elastomer/bitumen composition with a high content of functionalized elastomer was prepared. This composition was then neutralized with the fatty amine Polyram L 200, the neutralization being carried out as indicated in Example 3. The neutralized functionalized elastomer/bitumen composition thus obtained was then diluted as indicated in Example 2 to a final content of 3.5% of functionalized elastomer in the diluted composition.

For the elastomer/bitumen composition of Example 1 and for each of the diluted compositions obtained as indicated in Examples 2 to 7, the following characteristics were determined:

penetrability at 25° C. (Pen. 25), ring-and-ball softening temperature (RBT),

Pfeiffer's number (PN), tensile rheological characteristics, namely:
    breaking stress ($\sigma b$)
    elongation at break ($\epsilon b$).

The results obtained are collated in the following table.

TABLE

| EXAMPLE | 1 | 2 | 3 | 4 | 5 | 6 | 7 |
|---|---|---|---|---|---|---|---|
| Starting bitumen (parts by weight) | 965 | 900 | 900 | 900 | 900 | 900 | 900 |
| Elastomer (parts by weight) | 35 | 90 | 90 | 90 | 90 | 90 | 90 |

TABLE-continued

| EXAMPLE | 1 | 2 | 3 | 4 | 5 | 6 | 7 |
|---|---|---|---|---|---|---|---|
| PFA* | | | | | | | |
| Nature | | MA | MA | TA | TA | DPA | DPA |
| Parts by weight | | 5 | 5 | 10 | 10 | 5 | 5 |
| Amine (parts by weight) | | | 1.8 | | 1.8 | | 1.8 |
| Dilution bitumen (parts by weight) | | 1670 | 1670 | 1670 | 1670 | 1670 | 1670 |
| Pen. 25 (0.1 mm) | 60 | 58 | 55 | 50 | 50 | 49 | 46 |
| RBT (°C.) | 53.5 | 55 | 56 | 57 | 58 | 60 | 62 |
| PN | +0.009 | +0.30 | +0.40 | +0.41 | +0.62 | +0.98 | +1.21 |
| Tension at 20° C. | | | | | | | |
| σb (daN/cm$^2$) | 0.1 | 0.2 | 0.3 | 0.4 | 0.6 | 1.0 | 1.3 |
| εb (%) | 700 | 700 | 700 | 700 | >700 | >700 | >700 |
| Tension at 5° C. | | | | | | | |
| σb (daN/cm$^2$) | 4.0 | 2.0 | 1.0 | 3.5 | 4.0 | 7.0 | 9.0 |
| εb (%) | 130 | 200 | 340 | 400 | >700 | >700 | >700 |

PFA*: Polycarboxyl functionalization agent.
MA: Maleic anhydride.
TA: Thioglycolic acid.
DPA: 3,3'-Dithiodipropionic acid.

In the light of the results collated in the table, the following comments may be made:
- in situ functionalization employing a carboxyl functionalization agent according to the state of the art (Examples 2 to 5) or a polycarboxyl functionalization agent according to the invention (Examples 6 and 7) makes it possible to obtain functionalized elastomer/bitumen concentrates with a high content (9% in Examples 2 to 7) of functionalized elastomer without encountering gelling phenomena, the said concentrates not separating out, even after prolonged storage at high temperature;
- the physicomechanical characteristics of the diluted compositions obtained by dilution of the non-neutralized functionalized elastomer/bitumen concentrates (Examples 2, 4 and 6) are already improved with respect to the characteristics of the non-functionalized elastomer/bitumen compositions (Example 1), which demonstrates the effect of the carboxyl functional groups which induce crosslinking by formation of hydrogen bonds;
- the addition of reactive additives, such as, for example, a polyamine (Examples 3, 5 and 7), to the compositions resulting from bringing the bitumen into contact with the elastomer and the functionalization agent reinforces the consistency (improvement in the ring-and-ball temperature), the temperature susceptibility (increase in the Pfeiffer's number) and the elastomericity (higher εb and σb values) of the compositions by an ionomeric crosslinking effect;
- the functionalized elastomer/bitumen compositions resulting from the dilution of the non-neutralized (Example 6) or neutralized (Example 7) concentrates obtained by resorting to the polycarboxyl functionalization agents according to the invention exhibit improved physicomechanical properties, in particular consistency (increase in the ring-and-ball temperature), temperature susceptibility (higher Pfeiffer's number) and elastomericity (higher σb values), with respect to the corresponding functionalized elastomer/bitumen compositions resulting from the dilution of concentrates with the same content of non-neutralized (Examples 2 and 4) or neutralized (Examples 3 and 5) functionalized elastomer obtained by carrying out the functionalization by means of functionalization agents according to the state of the art (Examples 2 to 5).

We claim:
1. Process for the preparation of functionalized elastomer/bitumen compositions with a wide plasticity range in which a bitumen or a mixture of bitumens is brought into contact, the operation being carried out at temperatures of between 100° C. and 230° C. and with stirring for a period of time of at least ten minutes, with respect to the weight of the bitumen, between 0.5% and 25% of an elastomer and between 0.01% and 6% of a functionalization agent composed of at least one member selected from the group consisting of the compounds having the formulae

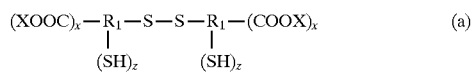

(a)

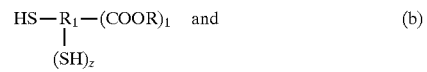

(b)

(c)

in which X represents a hydrogen atom or a radical R, each $R_1$ denotes an (x+z+1)-valent $C_1$ to $C_{12}$ hydrocarbon radical, R represents a monovalent $C_1$ to $C_{12}$ hydrocarbon radical, $R_2$ denotes an (x+t+1)-valent $C_2$ to $C_{12}$ hydrocarbon radical, t is zero or 1, each x denotes an integer having a value ranging from 1 to 3 and z is zero or 1, with x+z+1≦3.

2. Process according to claim 1, wherein the functionalization agent is composed of at least one disulphide of the formula $(XOOC)_x$—$R_3$—S—S $R_3$—$(COOX)_x$, where X denotes H or an R radical, x is an integer ranging from 1 to 3 and $R_3$ represents an (x+1)-valent $C_1$ to $C_{12}$ hydrocarbon radical.

3. Process according to claim 1, wherein, in the formulae of the functionalization agent, the $R_1$ and $R_3$ radicals are selected from the group consisting of saturated, linear or branched $C_1$ to $C_{12}$ aliphatic radicals, unsaturated linear or branched $C_2$ to $C_{12}$ aliphatic radicals, $C_4$ to $C_{12}$ cycloaliphatic radicals and $C_6$ to $C_{12}$ aromatic radicals, and the $R_2$ radical is selected from the group consisting of saturated, linear or branched $C_2$ to $C_{12}$ aliphatic radicals, $C_4$ to $C_{12}$ cycloaliphatic radicals and $C_6$ to $C_{12}$ aromatic radicals.

4. Process according to claim 1, wherein, in the formulae of the functionalization agent, the monovalent radical R is selected from the group consisting of saturated, linear or branched $C_1$ to $C_{12}$ aliphatic radicals, unsaturated, linear or branched $C_2$ to $C_{12}$ aliphatic radicals, $C_4$ to $C_{12}$ cycloaliphatic radicals and $C_6$ to $C_{12}$ aromatic radicals.

5. Process according to claim 1, wherein the functionalization agent is employed in an amount of between 0.05% and 3% by weight of the bitumen.

6. Process according to claim 1, wherein the amount of elastomer is between 1% and 15% by weight of the bitumen.

7. Process according to claim 1, wherein the bitumen or mixture of bitumens is chosen from bitumens having a kinematic viscosity at 100° C. of between $0.5 \times 10^{-4}$ $m^2/s$ and $3 \times 10^{-2}$ $m^2/s$.

8. Process according to claim 7, wherein the bitumen or mixture of bitumens has a penetrability at 25° C., defined according to NF Standard T 66 004, of between 5 and 800.

9. Process according to claim 1, wherein the elastomer is a random or block copolymer of styrene and of a conjugated diene.

10. Process according to claim 9, wherein the copolymer of styrene and of conjugated diene contains, by weight, 5 to 50% of styrene.

11. Process according to claim 9, wherein the weight-average molecular weight of the copolymer of styrene and of conjugated diene is between 10,000 and 600,000 daltons.

12. Process according to claim 1, wherein a peroxide compound which generates free radicals at temperatures of between 100° C. and 230° C., is added to the reaction mixture formed from the bitumen or mixture of bitumens, the elastomer and the functionalization agent, said peroxide compound being employed in an amount ranging up to 15% by weight of the elastomer.

13. Process according to claim 1, wherein the bitumen or mixture of bitumens is brought into contact with the elastomer, the functionalization agent and, if it is employed, the peroxide compound by first incorporating the elastomer in the bitumen or mixture of bitumens, the operation being carried out at temperatures of between 100° C. to 230° C. and with stirring, for a period of time of a few tens of minutes to 8 hours, in order to form a homogeneous mixture of bitumen and of elastomer, then introducing the functionalization agent into said mixture, followed, if it is employed, by the peroxide compound, in appropriate amounts, and by maintaining the whole mixture with stirring at temperatures of between 100° C. and 230° C. and identical or not to the temperatures for incorporation of the elastomer in the bitumen or mixture of bitumens, for a period of time of at least 10 minutes, in order to form a reaction product constituting the functionalized elastomer/bitumen composition.

14. Process according to claim 13, wherein said reaction product constituting the functionalized elastomer/bitumen composition has added to it, the addition being carried out with stirring at temperatures of between 100° C. and 230° C., at least one additive capable of reacting with the carboxyl or carboxylic ester functional groups carried by the elastomer and optionally by the bitumen.

15. Process according to claim 14, wherein the amount of reactive additive or reactive additives incorporated in said reaction product represents 0.01% to 10% of the weight of bitumen contained in the reaction product.

16. Process according to claim 1, wherein the reaction mixture formed by bringing the bitumen or mixture of bitumens, the elastomer, the functionalization agent and, if it is employed, the peroxide compound, into contact or the reaction product resulting from said operation of bringing these ingredients into contact has added to it, the addition being carried out with stirring at temperatures of between 100° C. and 230° C., 1% to 40% of a fluxing agent, the latter being a hydrocarbon oil which has an atmospheric pressure distillation range, determined according to ASTM Standard D 86-67, of between 100° C. and 600° C.

17. Process according to claim 16, wherein the elastomer, the functionalization agent and optionally, if it is employed, the peroxide compound, are incorporated in the bitumen or mixture of bitumens in the form of a mother solution of these products in the hydrocarbon oil chosen to constitute the fluxing agent.

18. Process according to claim 17, wherein the mother solution containing the elastomer, the functionalization agent and optionally, if it is employed, the peroxide compound, is mixed with the bitumen or mixture of bitumens, the operation being carried out at temperatures of between 100° C. and 230° C. and with stirring, and then the resulting mixture is maintained with stirring at temperatures of between 100° C. and 230° C. for a period of time of at least 10 minutes, in order to form a reaction product constituting the functionalized elastomer/bitumen composition.

19. A process for coating road surfaces which comprises applying to the road surfaces functionalized elastomer/bitumen binders comprised of the compositions of claim 1 or said compositions diluted with a bitumen or mixture of bitumens, which functionalized elastomer/bitumen binders are applied directly or after conversion into aqueous emulsion, to the road surfaces.

20. Mother solution which can be employed for the preparation of functionalized elastomer/bitumen compositions comprising (i) a hydrocarbon oil which has an atmospheric pressure distillation range, determined according to ASTM Standard D 86-67, of between 100° C. and 600° C. and (ii) an elastomer, wherein said mother solution also contains, in solution, a functionalization agent and optionally a peroxide compound, which functionalization agent is composed of at least one member selected from the group consisting of the compounds having the formulae

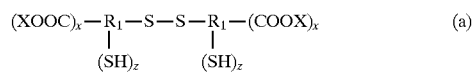

$$HS-R_2-(COOH)_x \quad \text{(c)}$$
$$|$$
$$(SH)_z$$

in which X represents a hydrogen atom or a radical R, each $R_1$ denotes an (x+z+1)-valent $C_1$ to $C_{12}$ hydrocarbon radical, R represents a monovalent $C_1$ to $C_{12}$ hydrocarbon radical, $R_2$ denotes an (x+t+1)-valent $C_2$ to $C_{12}$ hydrocarbon radical, t is zero or 1, each x denotes an integer having a value ranging from 1 to 3 and z is zero or 1, with $x+z \leq 3$.

21. Mother solution according to claim 20, wherein in the formulae of the functionalization agent, the $R_1$ and $R_3$ radicals are selected from the group consisting of saturated, linear or branched, $C_1$ to $C_{12}$ aliphatic radicals, unsaturated, linear or branched, $C_2$ to $C_{12}$ aliphatic radicals, $C_4$ to $C_{12}$ cycloaliphatic radicals and $C_6$ to $C_{12}$ aromatic radicals, and the $R_2$ radical is selected from the group consisting of saturated, linear or branched, $C_2$ to $C_{12}$ aliphatic radicals, unsaturated, linear or branched, $C_2$ to $C_{12}$ aliphatic radicals, $C_4$ to $C_{12}$ cycloaliphatic radicals and $C_6$ to $C_{12}$ aromatic radicals.

22. Mother solution according to claim 20, wherein in the formulae of the functionalization agent, the monovalent radical R is selected from the group consisting of saturated, linear or branched $C_1$ to $C_{12}$ aliphatic radicals, unsaturated, linear or branched $C_2$ to $C_{12}$ aliphatic radicals, $C_4$ to $C_{12}$ cycloaliphatic radicals and $C_6$ to $C_{12}$ aromatic radicals.

23. Mother solution according to claim 20, wherein the elastomer is a random or block copolymer of styrene and of a conjugated diene.

24. Mother solution according to claim 23, wherein the weight-average molecular weight of the copolymer of styrene and of conjugated diene is between 10,000 and 600,000 daltons.

25. Mother solution according to claim 20, wherein the hydrocarbon oil is selected from the group consisting of petroleum cuts of aromatic nature, petroleum cuts of naphthenoaromatic nature, petroleum cuts of naphthenoparaffinic nature, petroleum cuts or paraffinic nature, coal oils and oils of plant origin.

26. Mother solution according to claim 20, which contains, by weight of the hydrocarbon oil, between 5% and 40% of elastomer, between 0.05% and 10% of functionalization agent and, by weight of the elastomer, 0% to 15% of the peroxide compound.

27. Mother solution according to claim 26, which contains, by weight of the hydrocarbon oil, between 10% and 30% of elastomer, between 0.1% and 8% of functionalization agent and by weight of the elastomer, 0% to 10% of the peroxide compound.

28. Process according to claim 1, wherein in the formulae (a), (b) and (c), X represents a radical R consisting of a monovalent $C_1$ to $C_8$ hydrocarbon radical, $R_2$ denotes an (x+t+1)-valent $C_2$ to $C_8$ hydrocarbon radical and x is equal to 1 or 2.

29. Process according to claim 2, wherein the disulphide has the formula $(HOOC)_x—R_3—S—S—R_3—(COOH)_x$ wherein x and $R_3$ are as indicated.

30. Process according to claim 2, wherein in the disulphide formula, x is equal to 1 or 2 and $R_3$ represents an (x+1)-valent $C_1$ to $C_8$ hydrocarbon radical and $R_2$ denotes an (x+t=1)-valent $C_1$ to $C_8$ hydrocarbon radical.

31. Process according to claim 3, wherein in the formulae of the functionalization agent, the $R_1$ and $R_3$ radicals are selected from the group consisting of saturated, linear or branched, $C_1$ to $C_8$ cycloaliphatic radicals and $C_6$ to $C_8$ aromatic radicals, whereas the $R_2$ radical is selected from the group consisting of saturated, linear or branched, $C_2$ to $C_8$ aliphatic radicals, unsaturated, linear or branched, $C_2$ to $C_8$ aliphatic radicals, $C_6$ to $C_8$ cycloaliphatic radicals and $C_6$ to $C_8$ aromatic radicals.

32. Process according to claim 3, wherein in the formulae of the functionalization agent, the $R_1$ to $R_3$ radicals are saturated, linear or branched, $C_1$ to $C_6$ aliphatic radicals are unsaturated, linear or branched, $C_2$ to $C_6$ aliphatic radicals or unsaturated, linear or branched, $C_2$ to $C_6$ cycloaliphatic radicals and $C_6$ to $C_8$ aromatic radicals.

33. Process according to claim 4, wherein in the formulae of the functionalization agent, the monovalent radical R is selected from the group consisting of saturated, linear or branched, $C_1$ to $C_8$ aliphatic radicals, unsaturated, linear or branched, $C_2$ to $C_8$ aliphatic radicals and $C_6$ to $C_8$ aromatic radicals.

34. Process according to claim 33, wherein said monovalent radical R is a linear or branched $C_1$ to $C_{12}$ alkyl radical.

35. Process according to claim 7, wherein said kinematic viscosity at 100° C. is between $1 \times 10^{-4} m^2/s$ and $2 \times 10^{-2} m^2/s$.

36. Process according to claim 8, wherein said penetrability is between 10 and 400.

37. Process according to claim 36, wherein said conjugated diene is selected from the group consisting of butadiene, isoprene, chloroprene, carboxylated butadiene and carboxylated isoprene.

38. Process according to claim 11, wherein said weight-average molecular weight is between 30,000 and 400,000 daltons.

39. Process according to claim 1, wherein the bitumen or mixture of bitumens is brought into contact with the elastomer, the functionalization agent and, if it is employed, the peroxide compound, by first of all incorporating the elastomer in the bitumen or mixture of bitumens, the operation being carried out at temperatures of between 120° C. and 190° C. and with stirring, for a period of time of 30 minutes to 8 hours, in order to form a homogeneous mixture of bitumen and elastomer, then introducing the functionalization agent into said mixture, followed, if it is employed, by the peroxide compound, in appropriate amounts, and by maintaining the whole mixture with stirring at temperatures of between 120° C. and 190° C. and identical or not, the temperatures for incorporation of the elastomer in the bitumen or mixture of bitumens, for a period of time of 10 minutes to 5 hours, in order to form a reaction product constituting the functionalized elastomer/bitumen composition.

40. Process according to claim 14, wherein said at least one additive is selected from the group consisting of primary amines, secondary amines, polyamines, alcohols, aminoalcohols, polyols, epoxides and metal compounds.

41. Process according to claim 40, wherein said metal compounds are compounds of metals from groups 1, II, III or VIII of the Periodic Table of the Elements.

42. Process according to claim 15, wherein said amount represents 0.05% to 5% of the weight of bitumen contained in the reaction product.

43. Process according to claim 16, wherein the amount of fluxing agent represents 2% to 30% by weight of the bitumen.

44. Process according to claim 16, wherein said distillation temperature range lies between 150° C. and 400° C.

45. Process according to claim 18, wherein the mother solution containing the elastomer, the functionalization agent and optionally, if it is employed, the peroxide compound, is mixed with the bitumen or mixture of bitumens, the operation being carried out at temperatures of between 120° C. and 190° C. and with stirring, and then the resulting mixture is maintained with stirring at temperatures of between 120° C. and 190° C., for a period of time ranging from 10 minutes to 90 minutes, in order to form a reaction product constituting the functionalized elastomer/bitumen composition.

46. Mother solution according to claim 20, wherein the functionalization agent is composed of at least one disulphide of the formula $(XOOC)_x—R_3—S—S\ R_3—(COOX)_x$ where X denotes H or an R radical, x is an integer ranging from 1 to 3 and $R_3$ represents an (x+1)-valent $C_1$ to $C_{12}$ hydrocarbon radical.

47. Mother solution according to claim 46, wherein in the disulphide formula, x is equal to 1 or 2 and $R_3$ represents an (x+1)-valent $C_1$ to $C_8$ hydrocarbon radical.

48. Mother solution according to claim 46, wherein the disulphide has the formula $(HOOC)_x\ R_3\ S\ S\ R_3\ (COOH)_x$ wherein x and $R_3$ are as indicated.

49. Mother solution according to claim 20, wherein in the formulae (a), (b) and (c), X represents a radical R consisting of a monovalent $C_1$ to C8 hydrocarbon radical, each $R_1$ denotes an (x+z+1)-valent $C_1$ to C8 hydrocarbon radical, $R_2$ denotes an (x+t+1)-valent $C_2$ to $C_8$ hydrocarbon radical and x is equal to 1 or 2.

50. Mother solution according to claim 20, wherein in the formulae of the functionalization agent, the $R_1$ and $R_3$ radicals are selected from the group consisting of saturated, linear or branched, $C_1$ to $C_8$ aliphatic radicals, unsaturated, linear or branched, $C_2$ to $C_8$ aliphatic radicals, $C_6$ to $C_8$ aliphatic radicals, unsaturated, linear or branched, $C_2$ to $C_8$ aliphatic radicals, $C_6$ to $C_8$ cycloaliphatic radicals and $C_6$ to $C_8$ aromatic radicals, wherein the $R_2$ radical is selected from the group consisting of saturated, linear or branched, $C_2$ to $C_8$ aliphatic radicals, unsaturated, linear or branched, $C_2$ to $C_8$ aliphatic radicals, $C_6$ to $C_8$ cycloaliphatic radicals and $C_6$ to $C_8$ aromatic radicals.

51. Mother solution according to claim 21, wherein said $R_1$ and $R_3$ radicals are saturated, linear or branched, $C_1$ to $C_6$ aliphatic radicals are unsaturated, linear or branched, $C_2$ to $C_6$ aliphatic radicals, wherein the $R_2$ radical is a saturated, linear or branched, $C_2$ to $C_6$ aliphatic radical or an unsaturated, linear or branched, $C_2$ to $C_6$ aliphatic radical.

52. Mother solution according to claim 20, wherein in the formula of the functionalization agent, the monovalent radical R is selected from the group consisting of saturated, linear or branched, $C_1$ to $C_8$ aliphatic radicals, unsaturated, linear or branched, $C_2$ to $C_8$ aliphatic radicals, $C_6$ to C8 cycloaliphatic radicals and $C_6$ to $C_8$ aromatic radicals.

53. Mother solution according to claim 52, wherein said monovalent radial R is a linear or branched, $C_1$ to $C_{12}$ alkyl radical.

54. Mother solution according to claim 23, wherein said conjugated diene is selected from the group consisting of butadiene, isoprene, chloroprene, carboxylated butadiene and carboxylated isoprene.

55. Mother solution according to claim 23, wherein the copolymer of styrene and conjugated diene has a styrene content ranging from 5 to 50% by weight.

56. Mother solution according to claim 23, wherein said weight-average molecular weight is between 30,000 and 400,000 daltons.

* * * * *

UNITED STATES PATENT AND TRADEMARK OFFICE
CERTIFICATE OF CORRECTION

PATENT NO. : 5,883,162
DATED : March 16, 1999
INVENTOR(S) : Jean-Pascal PLANCHE, Laurent GERMANAUD and Annie ZINS It is certified that error appears in the above-identified patent and that said Letters Patent is hereby corrected as shown below:

In item [73] on first page; "Elf Exploration Production, Cedex, France" should read --Elf Antar France, Courbevoie, France--

Column 5, lines 38-39; the formula should read:
   --HO $\!+\!$ 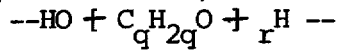 $\!+\!$ $_r$H --

Column 12, line 36; "with respect to" should read --with, with respect to--

Column 12, line 44, in formula (b); that portion of the formula reading "-(COOR)$_1$" should read -- -(COOR)$_x$ --

Column 12, line 49, in formula (c); that portion of the formula reading "(SH)$_z$" should read: --(SH)$_t$--

Column 12, line 58; that portion of the formula reading "-R$_3$-S-S R$_3$-" should read -- -R$_3$-S-S-R$_3$- --

Column 13, line 2; "aliphatic radicals, C$_4$" should read --aliphatic radicals, unsaturated, linear or branched C$_2$ to C$_{12}$ aliphatic radicals, C$_4$ --

Column 14, line 48, (formula c); that portion of formula reading "(SH)$_z$" should read --(SH)$_t$ --

Column 15, line 17; "cuts or" should read --cuts of--

Column 15, line 39; "hydrocarbon radical" should read --hydrocarbon radical.-- and rest of the claim should be deleted.

UNITED STATES PATENT AND TRADEMARK OFFICE
CERTIFICATE OF CORRECTION

PATENT NO. : 5,883,162

DATED : March 16, 1999

INVENTOR(S) : Jean-Pascal PLANCHE, Laurent GERMANAUD and Annie ZINS

It is certified that error appears in the above-identified patent and that said Letters Patent is hereby corrected as shown below:

Column 15, line 44; "$C_1$ to $C_8$ cycloaliphatic" should read:
--$C_1$ to $C_8$ aliphatic radicals, unsaturated linear or branched, $C_2$ to $C_8$ aliphatic radicals, $C_6$ to $C_8$ cycloaliphatic--

Column 15, line 52; "are" should read --or--

Column 15, lines 53-55; "or unsaturated, linear or branched, $C_2$ to $C_6$ cycloaliphatic radicals and $C_6$ to $C_8$ aromatic radicals" should read --whereas the $R_2$ radical is a saturated linear or branched, $C_2$ to $C_6$ aliphatic radical or an unsaturated linear or branched $C_2$ to $C_6$ aliphatic radical.--

Column 15, lines 60-61; "aliphatic radicals and $C_6$ to $C_8$ aromatic radicals." should read: --aliphatic radicals, $C_6$ to $C_8$ cycloaliphatic radicals and $C_6$ to $C_8$ aromatic radicals.--

Column 16, line 62; the formula should read: -- $(HOOC)_x-R_3-S-S-R_3-(COOH)_x$ --

Column 17, lines 7-9; cancel --$C_6$ to $C_8$ aliphatic radicals, unsaturated, linear or branched, $C_2$ to $C_8$ aliphatic radicals--

UNITED STATES PATENT AND TRADEMARK OFFICE
CERTIFICATE OF CORRECTION

PATENT NO. : 5,883,162
DATED : March 16, 1999
INVENTOR(S) : Jean-Pascal PLANCHE, Laurent GERMANAUD and Annie ZINS It is certified that error appears in the above-identified patent and that said Letters Patent is hereby corrected as shown below:

Column 17, line 17; "are" should read --or--

Signed and Sealed this

Eleventh Day of July, 2000

Attest:

Q. TODD DICKINSON

*Attesting Officer*  *Director of Patents and Trademarks*